United States Patent
Alameh et al.

(10) Patent No.: US 10,770,071 B2
(45) Date of Patent: Sep. 8, 2020

(54) ELECTRONIC DEVICE WITH VOICE PROCESS CONTROL AND CORRESPONDING METHODS

(71) Applicant: Motorola Mobility LLC, Chicago, IL (US)

(72) Inventors: Rachid Alameh, Crystal Lake, IL (US); John Gorsica, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 127 days.

(21) Appl. No.: 16/192,439

(22) Filed: Nov. 15, 2018

(65) Prior Publication Data

US 2020/0160857 A1    May 21, 2020

(51) Int. Cl.
*G10L 15/22* (2006.01)
*G06F 3/16* (2006.01)
*G10L 17/00* (2013.01)

(52) U.S. Cl.
CPC .............. *G10L 15/22* (2013.01); *G06F 3/167* (2013.01); *G10L 17/005* (2013.01); *G10L 2015/223* (2013.01)

(58) Field of Classification Search
CPC ......... G06F 21/31; G06F 21/32; G10L 17/00; G10L 2015/223
See application file for complete search history.

(56) References Cited

U.S. PATENT DOCUMENTS

| | | | |
|---|---|---|---|
| 9,098,467 B1* | 8/2015 | Blanksteen | G10L 15/22 |
| 9,147,054 B1* | 9/2015 | Beal | G06F 21/32 |
| 2003/0122652 A1* | 7/2003 | Himmelstein | B60R 25/257 |
| | | | 340/5.81 |
| 2006/0087924 A1* | 4/2006 | Fried | H04B 1/385 |
| | | | 369/30.01 |
| 2013/0317827 A1* | 11/2013 | Fu | G10L 17/00 |
| | | | 704/273 |
| 2014/0330560 A1* | 11/2014 | Venkatesha | G10L 15/26 |
| | | | 704/235 |

(Continued)

OTHER PUBLICATIONS

"Google Search Help", "Ok Google" voice searches and actions; Copyright 2018; Viewed Dec. 16, 2018; Unknown publication date but believe to be prior to filing of present application; https://support.google.com/websearch/answer/2940021?co=GENIE.Platform%3DAndroid&hl=en.

(Continued)

*Primary Examiner* — Jialong He
(74) *Attorney, Agent, or Firm* — Philip H. Burrus, IV

(57) ABSTRACT

An electronic device includes one or more sensors and one or more processors. The one or more sensors receive a first audio input defining a process initiation command and initiate, in response to the process initiation command, a process. Thereafter, the one or more sensors receive a second audio input defining a process cessation command. The one or more processors determine whether one or more substantially matching audio characteristics are present in both the first audio input and the second audio input. Where they are absent from one of the first audio input or the second audio input, the one or more processors ignore the process cessation command and continuing the process. Where they are present, the one or more processors cease the process in response to the process cessation command.

20 Claims, 6 Drawing Sheets

(56) References Cited

U.S. PATENT DOCUMENTS

2015/0162006 A1* 6/2015 Kummer .......... H04N 21/47217
            704/275
2019/0189132 A1* 6/2019 Viswanathan .......... G10L 17/24

OTHER PUBLICATIONS

"Google Search Help Forum", Ok Google voice training; Posted Apr. 10, 2018; https://productforums.google.com/forum/#!msg/websearch/5XYFGUfLLsk/DNwKjBiVBgAJ.

* cited by examiner

ELECTRONIC DEVICE WITH VOICE PROCESS CONTROL AND CORRESPONDING METHODS

BACKGROUND

Technical Field

This disclosure relates generally to electronic devices, and more particularly to electronic devices with voice controllable features.

Background Art

Modern electronic communication devices including numerous features. Some of these electronic devices include voice assistant capabilities. Such voice assistants can simplify electronic device interaction, as a user can speak commands to an electronic device rather than having to physically manipulate controls of the electronic device. It would be advantageous to have improved voice assistant capabilities to broaden the beneficial and productive capabilities of these devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
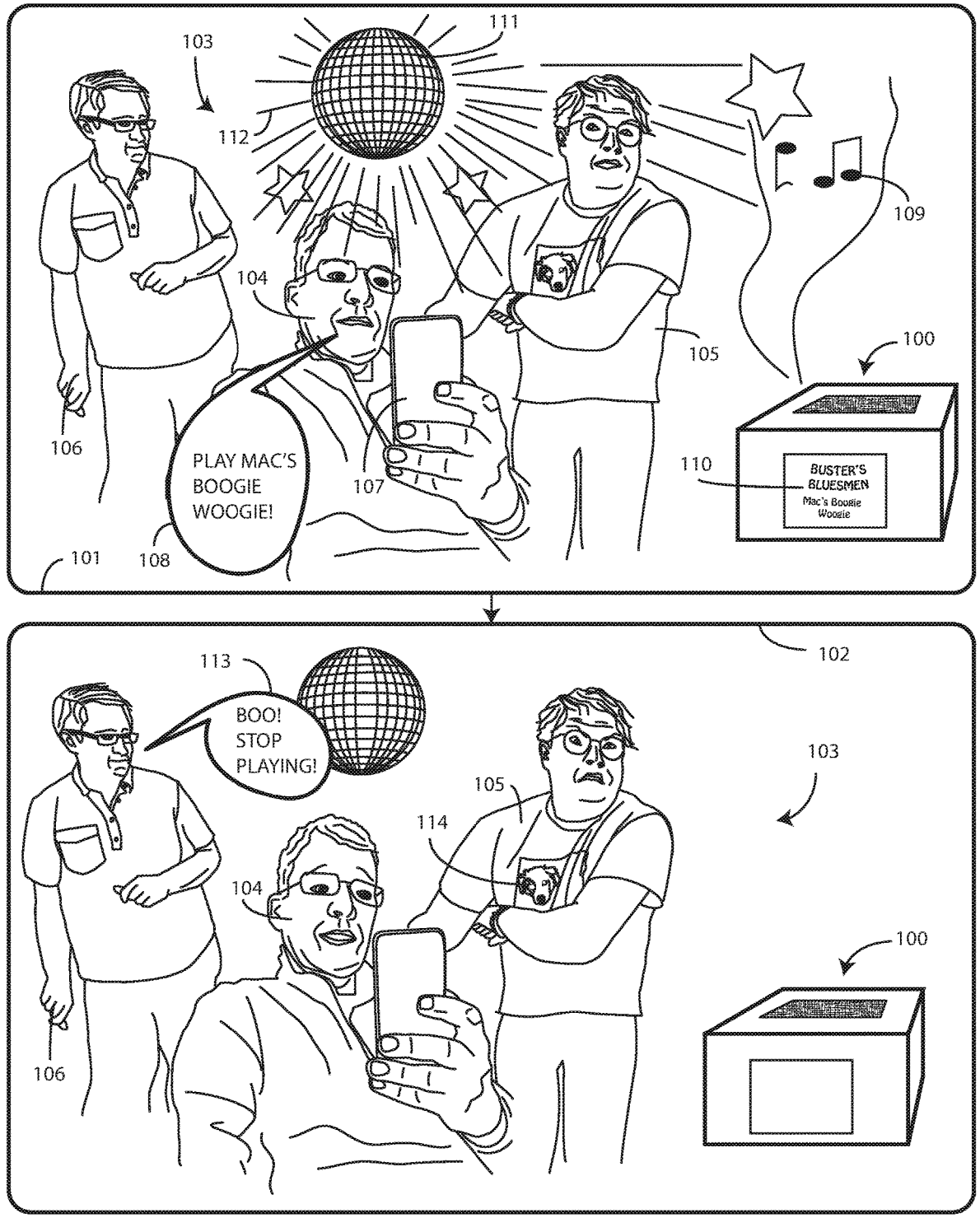
FIG. 1 illustrates a frustrating prior art situation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to ensuring that audio input received by audio input devices of an electronic device to commence a process sufficiently matches other audio input received by the audio input devices to cease a process. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of confirming that audio input comprising a process cessation command sufficiently matches other audio input comprising a process initiation command before executing the process cessation command. The non-processor circuits may include, but are not limited to, a radio receiver, a radio transmitter, signal drivers, clock circuits, power source circuits, and user input devices.

As such, these functions may be interpreted as steps of a method to perform the confirmation that second audio input comprising a process cessation command sufficiently matches first audio input comprising a process initiation command and, where it does not, ignoring the process cessation command. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Turning now to FIG. 1, illustrated therein is a frustrating situation that can occur when using a prior art electronic device 100 having voice assistant capabilities. Beginning at step 101, a party 104 is occurring. The host 104 of the party 103 is showing pictures to the guests 105,106 of the party 103 on a mobile device 107. While entertained by the pictures on the mobile device 107, the guests 105,106 are beginning to get antsy, and are hoping for the party 103 to be enlivened.

Being a fan of William Congreve, and especially of the poem, "The Mourning Bride," the host 104 understands that music, in the words of Congreve, "hath charms to soothe the savage beast." Accordingly, in an effort to keep the guests 105,106 happy, the host 104 delivers a voice command to the prior art electronic device 100. Specifically, the host 104 states, "Play 'Mac's Boogie Woogie.'"

The prior art electronic device 100 receives this voice command 108 and executes the same, causing "Mac's Boogie Woogie" 109, by the legendary Buster and his Bluesmen 110, to begin to play. A guest 106 manually spins a disco ball 111, while another guest 105 turns on spotlights 112, which reflect from the disco ball 111. The party 103 is now jumping.

There is only one problem. Guest 106 turns out to be a real square. Unlike the rest of the guests at the party 103, it turns out that guest 106 is not a fan of Buster and his Bluesmen 110. Guest 106 instead prefers pink noise, and where pink noise is unavailable, guest 106 prefers the repetitive clicking sound of a ballpoint pen.

To stop "Mac's Boogie Woogie," guest 106 takes it upon himself at step 102 to give a second voice command 113. Specifically, guest 106 says, "Boo! Stop playing," with "stop playing" being a command for the prior art electronic device 100 to stop playing "Mac's Boogie Woogie" 109. The prior art electronic device 100 complies, and the music stops. The host 104, understandably, is horrified. Guest 105, a huge Buster fan with a picture 114 of Buster on his shirt, is visibly angry. Guest 105 turns off the spotlight 112 and stops the disco ball 111. The party 103 is now a bust.

This situation is incredibly frustrating. The fact that the prior art electronic device 100 has a prior art voice assistant allows anyone in the crowd at the party 103 to equally control the prior art electronic device 100. Thus, even if the host 104 wants to make his guests happy with fantastic music, one square peg can ruin the fun by stopping the music with a simple voice command 113.

Embodiments of the present disclosure solve this incredibly frustrating program by confirming that a user attempting to stop an action performed by an electronic device with a voice command is the same that starts the action with a voice command. Said differently, embodiments of the disclosure provide electronic devices and systems where when a user starts an action with the electronic device by way of a voice command, the same user—and only the same user—can stop the action or change the action while it is continuing.

In one or more embodiments, following the receipt of a voice command, an electronic device configured in accordance with one or more embodiments of the disclosure captures one or more voice characteristics corresponding to the voice command. The electronic device then initiates a process requested by the voice command. Examples of such processes include playing music, presenting images or videos, making voice calls, sending text messages or multimedia messages, interacting with remote computer systems across a network, storing data in memory, and so forth. Other examples of such processes include Some examples of initiated processes, searching the web, accessing social media sites, using navigation systems. Others will be obvious to those of ordinary skill in the art having the benefit of this disclosure.

In one or more embodiments, any voice commands received by the electronic device while the processes is occurring, initiated, or underway, e.g., while a requested song or playlist is being played, which does not match the originally extracted audio characteristics is ignored. In one or more embodiments, the electronic device will not act upon such a voice command until the initiated process has ceased or timed out.

It should be noted that while the voice characteristics extracted from a process initiation command can be those of an authorized user of an electronic device, in other embodiments they can be the voice characteristics of a generic user. Embodiments of the disclosure contemplate that the methods, devices, and systems described herein can, in some embodiments, be available to a plurality of users. Thus, if an electronic device configured in accordance with embodiments of the disclosure were positioned at a party of one hundred people, in one or more embodiments any of the one hundred people could deliver a process initiation command to the electronic device via audio input. However, in one or more embodiments, only the person delivering the process initiation command could, successfully, deliver a process cessation command causing the process to stop. If one or more audio characteristics from the process initiation command fail to sufficiently match audio characteristics from the process cessation command, in one or more embodiments one or more processors of the electronic device will ignore the process cessation command. Advantageously, while anyone can use an electronic device to start a process in one or more embodiments, only the person who started the process can stop it. In other embodiments, the person starting the process and ceasing the process must not only be the same (a primary embodiment of the disclosure), but must also be an authorized user of the electronic device.

Thus, in one or more embodiments the same voice starting an action or process is required to end the started action or process so long as the action or process is underway. One or more audio characteristics can be analyzed when audio input comprising a process initiation command or process cessation command is received. These audio characteristics can be tagged and/or stored. The command can be interpreted and the process initiated. In one or more embodiments, the action or process can only be changed or ended when substantially the same audio characteristics are detected in audio input comprising a process cessation command or process change command.

In one or more embodiments, electronic devices can advantageously eliminate false command reception by filtering crowd noise from a person delivering audio input comprising a process cessation command or process change command. Moreover, as noted above, while the person delivering audio input comprising a process cessation command or process change command may have to be an authorized user of the electronic device, in other embodiments there is no requirement whatsoever that the person delivering audio input comprising a process cessation command or process change command be a previously authorized user of the electronic device. This advantageously allows devices configured in accordance with one or more embodiments of the disclosure to receive voice commands from many people. Where there is no authorized user requirement, any person can start a process or action. However, in one or more embodiments, only that person who started the process or action can stop or change it. This advantageously eliminates the frustration that killed the party 103 of FIG. 1.

Figure 2:
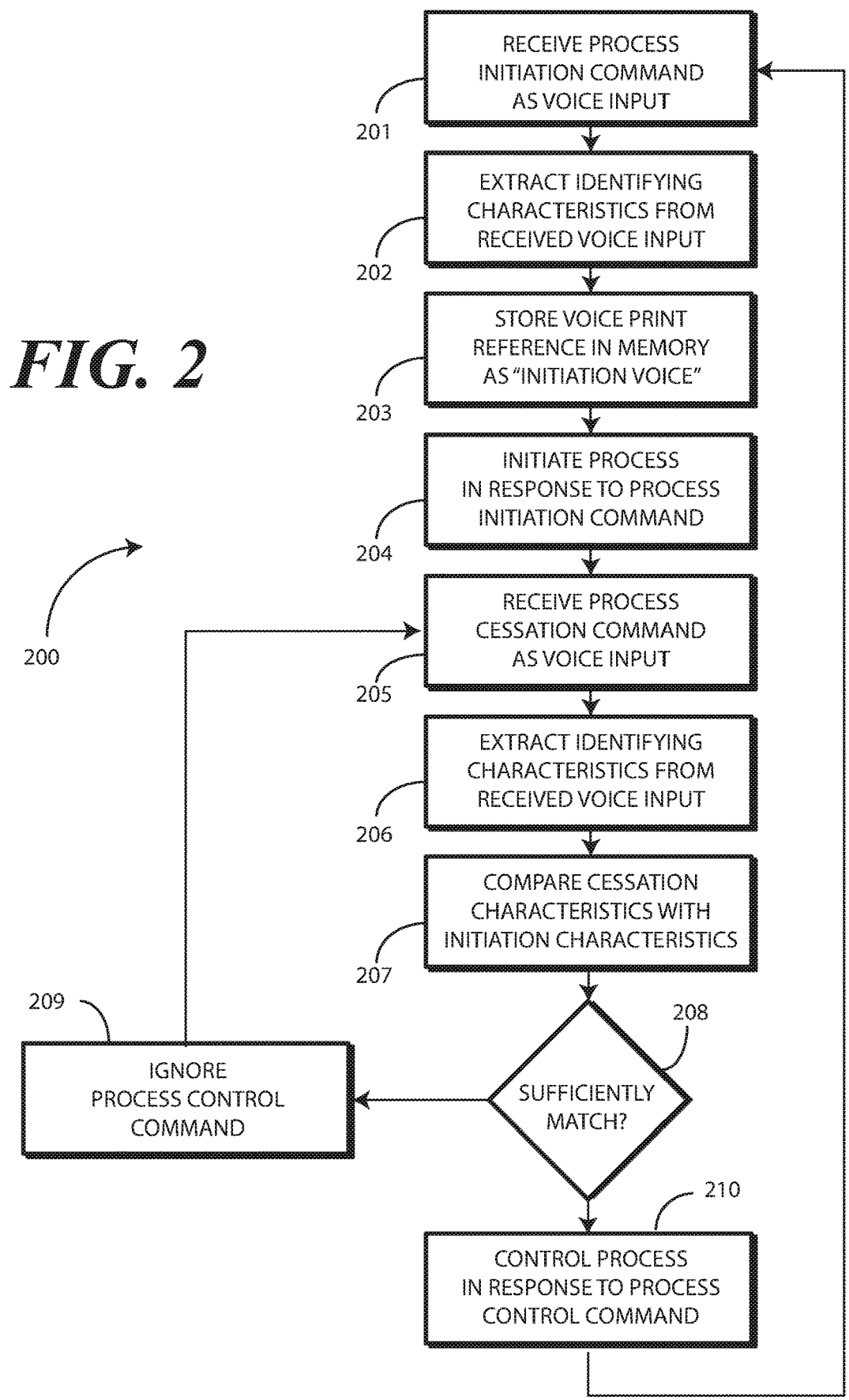
FIG. 2 illustrates one explanatory method in accordance with one or more embodiments of the disclosure.

Turning now to FIG. 2, illustrated therein is one explanatory method 200 in accordance with one or more embodiments of the disclosure. The method 200 is suitable for implementation in an electronic device configured in accordance with one or more embodiments of the disclosure, one of which will be described below with reference to FIG. 3. However, it should be noted that the electronic device could take any of a number of forms, including as a wireless communication device, a smartphone, a voice assistant module, a multimedia device, an Internet of Things (IoT) control module, a gaming device, a set-top box, computer, palm top computer, laptop computer, tablet computer, or other device. Still other electronic devices with which the method 200 of FIG. 2 will be beneficial will be obvious those of ordinary skill in the art having the benefit of this disclosure.

Beginning at step 201, the method 200 receives, with one or more audio input devices of an electronic device, audio input. In one or more embodiments, the audio input received at step 201 comprises a process initiation command. Illustrating by example, the process initiation command could be a request to play music such as, "Maya, play 'Tommy's Waltz' by Henry and Emma." The process initiation command could take other forms, such as requesting that the temperature of a room be changed by adjusting a thermostat, adjusting the lighting of a room by actuating, deactuating, or dimming lights, presenting images on a display or projection surface, or making a telephone call. These examples of processes or actions are illustrative only, as numerous others will be obvious to those of ordinary skill in the art having the benefit of this disclosure. In one or more embodiments, step 201 also includes identifying the voice command comprised in the audio input.

At step 202, the method 200 extracts one or more audio characteristics from the audio input received at step 201. These audio characteristics can include identifying characteristics that distinguish the audio input received at step 201 from other audio input received from another person. In one or more embodiments, the one or more audio characteristics extracted at step 202 include pitch, timbre, cadence, rhythm, volume, spectrum, and so forth. In some embodiments, the audio characteristics extracted will simply include the entire audio input. Other examples of audio characteristics that can be extracted from audio input received by one or more audio input devices will be obvious to those of ordinary skill in the art having the benefit of this disclosure.

At step 203, these extracted audio characteristics can be stored in a memory of the electronic device as a reference "voice print." Illustrating by example, a one or more processors of the electronic device comprising executable code and hardware configured as a voice recognition engine to perform the extraction of step 202 can be configured to store, at step 203, the extracted audio characteristics as voice print templates (also referred to as "voice models"). As will be described below with reference to decision 208, the one or more processors can use the voice print templates to compare one or more extracted audio characteristics from subsequently received audio input to determine if a sufficiently acceptable match exists.

At step 204, the method 200 comprises initiating, with one or more processors of the electronic device, the process identified at step 201. In one embodiment, this step 204 comprises initiating the process at the electronic device in response to the process initiation command. Thus, where the process initiation command comprises, "Maya, play 'Little Bit' by Henry and Emma," step 204 can comprise causing an audio output device of the electronic device to generate acoustic signals propagating the song, "Little Bit," into the environment about the electronic device, and so forth.

At step 205, the method 200 includes receiving, with the one or more audio input devices of the electronic device, a second audio input. In one or more embodiments, the second audio input comprises a process control command. Examples of process control commands include process modification commands and process cessation commands. A process modification command requests a modification to the process in progress, while a process cessation command requests a cessation of the process in progress. In one or more embodiments, step 205 further comprises identifying the process control command.

Illustrating by example, if the process initiation command received at step 201 was to "project pictures of our vacation" on a projection screen, with step 204 comprising an initiation of this projection of images, a process modification command may include a request to modify the presentation by making the images scroll faster, making them larger, making them dimmer, making them brighter, making them smaller, adding music to the presentation, and so forth. By contrast, a process cessation command may request the presentation of images to stop, or alternatively may request the process of presenting images to change to a different process. While process modification commands and process cessation commands are two illustrative examples of process control commands, others will be obvious to those of ordinary skill in the art having the benefit of this disclosure. For instance, a process restart command could request that the process be started anew, and so forth.

At step 206, the method 200 extracts one or more audio characteristics from the audio input received at step 205. As before, these audio characteristics can include identifying characteristics that distinguish the audio input received at step 205 from other audio input received from another person. The audio characteristics can also include the audio input itself, saved as a digital file. In one or more embodiments, the one or more audio characteristics extracted at step 205 include pitch, timbre, cadence, rhythm, volume, spectrum, and so forth. As noted above, other examples of audio characteristics that can be extracted from audio input received by one or more audio input devices will be obvious to those of ordinary skill in the art having the benefit of this disclosure.

At step 207, the method 200 compares the audio characteristics (or voice print) stored at step 203 with the audio characteristics extracted at step 206. Decision 208 then includes determining, with the one or more processors of the electronic device, whether one or more substantially matching audio characteristics (or voice prints) are present in both the first audio input received at step 201 and the second audio input received at step 205.

Where decision 208 determines one or more substantially matching audio characteristics (or voice prints) are present in both the first audio input received at step 201 and the second audio input received at step 205, the method moves to step 209 which can comprise executing, with the one or more processors of the electronic device, the process control command identified at step 205. Where the process control command comprises a process cessation command, step 209 can comprise ceasing the process in response to the process cessation command. Similarly, where the process control command comprises a process modification command, step 209 can comprise modifying the process, e.g., adjusting volume, brightness, content selection, and so forth, in response to the process cessation command.

By contrast, where decision 208 determines the one or more substantially matching audio characteristics are absent from one of the first audio input received at step 201 or the second audio input received at step 205, the method 200 can move to step 210, which can comprise ignoring, by the one or more processors, the process control command. Accordingly, the process can continue.

Thus, as set forth in FIG. 2, a method 200 allows a person to start an action by delivering a voice command via audio input to an electronic device. As set forth in this method 200, in one embodiment the person and only the same person, or, as will be described below, a person of a predefined group previously authorized to deliver commands to the electronic device, can stop the action or change the action while it is continuing. Also, as will be described below the audio processing engine can be assisted/supported/supplemented by employing other sensors such as camera of location to confirm same person starting altering and/or stopping process. In this method 200, following voice command, the method 200 captures voice characteristics of the person delivering the voice command carries out the action being requested following speech interpretation. Thereafter, any audio spoken/received by the electronic device while the requested action is taking place that does not sufficiently match the original audio characteristics is ignored and will not be acted on by electronic device until the action has ceased or is terminated by the person delivering the process initiation command.

Figure 3:
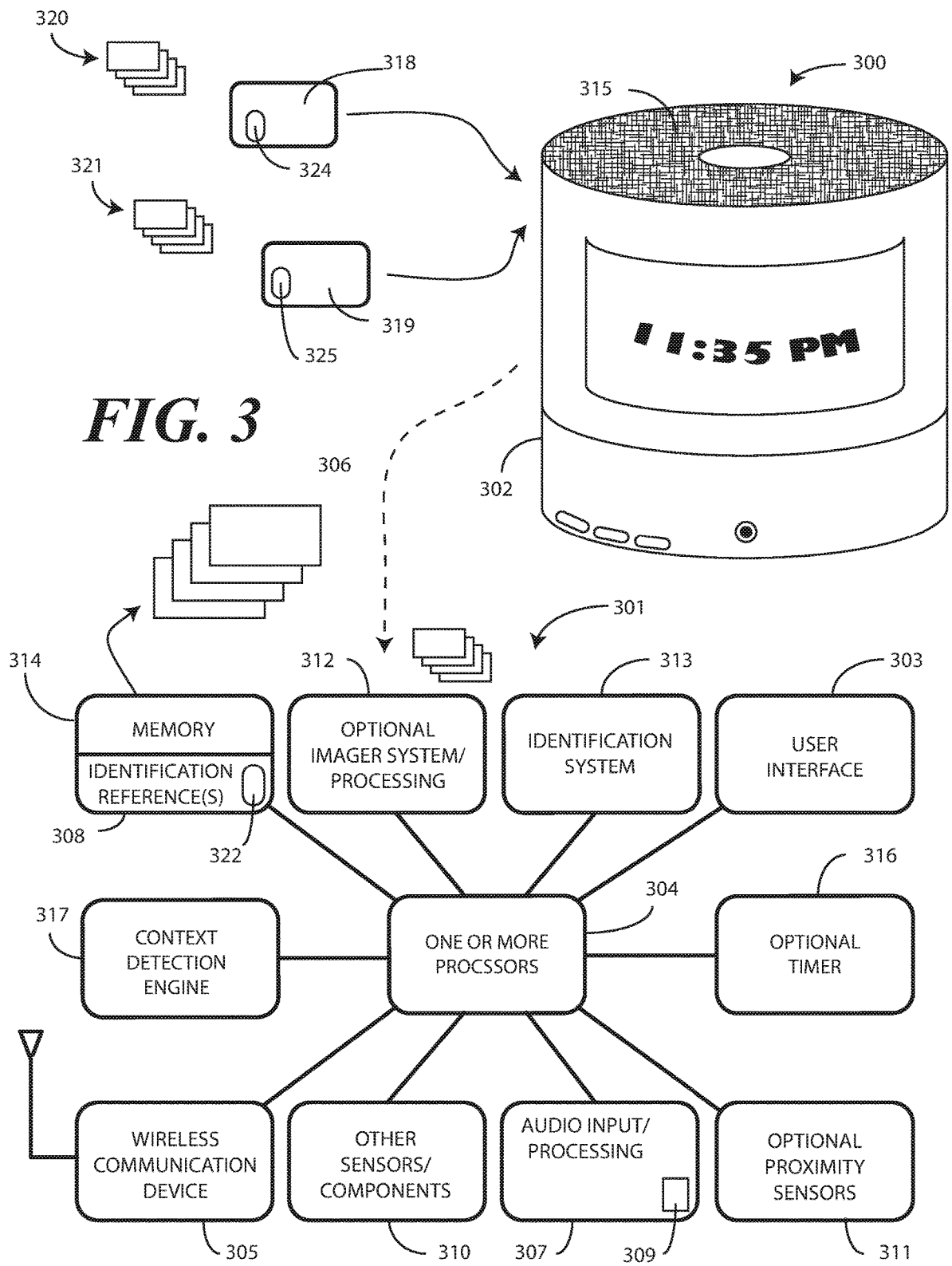
FIG. 3 illustrates one explanatory electronic device configured in accordance with one or more embodiments of the disclosure.

Turning now to FIG. 3, illustrated therein is one explanatory electronic device 300 configured in accordance with one or more embodiments of the disclosure. An explanatory block diagram schematic 301 is also shown in FIG. 3. The block diagram schematic 301 can be configured as a printed circuit board assembly disposed within a housing 302 of the electronic device 300. Various components can be electrically coupled together by conductors or a bus disposed along one or more printed circuit boards.

The electronic device 300 is illustratively shown as a generic media player for explanatory purposes in FIG. 3. It should be noted that the electronic device 300 could take a variety of forms. For instance, the electronic device 300 could alternatively be configured as a smartphone, a voice assistant module, a multimedia device, an Internet of Things (IoT) control module, a gaming device, a set-top box, computer, palm top computer, laptop computer, tablet computer, or other device. Still other examples of electronic devices will be obvious those of ordinary skill in the art having the benefit of this disclosure.

The illustrative block diagram schematic 301 of FIG. 3 includes many different components. Embodiments of the disclosure contemplate that the number and arrangement of such components can change depending on the particular application. Accordingly, electronic devices configured in accordance with embodiments of the disclosure can include some components that are not shown in FIG. 3, and other components that are shown may not be needed and can therefore be omitted.

The illustrative block diagram schematic 301 includes an optional user interface 303. In one or more embodiments, the user interface 303 optionally includes a display, which may optionally be touch-sensitive. However, in other embodiments the electronic device 300 will include no display. Embodiments of the disclosure contemplate that many voice-controllable devices configured in accordance with embodiments of the disclosure will operate via audio alone, and without the necessity of a display. Where a display is included, in one embodiment, users can deliver user input to the display of such an embodiment by delivering touch input from a finger, stylus, or other objects disposed proximately with the display.

In one embodiment, the electronic device 300 includes one or more processors 304. The one or more processors 304 can include a microprocessor, a group of processing components, one or more ASICs, programmable logic, or other type of processing device. The one or more processors 304 can be operable with the various components of the block diagram schematic 301. The one or more processors 304 can be configured to process and execute executable software code to perform the various functions of the electronic device with which the block diagram schematic 301 operates. A storage device, such as memory 314, can optionally store the executable software code used by the one or more processors 304 during operation.

In this illustrative embodiment, the block diagram schematic 301 also includes a communication device 305 that can be configured for wired or wireless communication with one or more other devices or networks. The communication device 305 may also utilize wireless technology for communication, such as, but are not limited to, peer-to-peer or ad hoc communications, as well as other forms of wireless communication such as infrared technology. The communication device 305 can include wireless communication circuitry, one of a receiver, a transmitter, or transceiver, and one or more antennas.

In one embodiment, the one or more processors 304 can be responsible for performing the primary functions of the electronic device 300 with which the block diagram schematic 301 is operational. The executable software code used by the one or more processors 304 can be configured as one or more modules 306, which can include a voice recognition engine in one embodiment, and that are operable with the one or more processors 304. Such modules 306 can store instructions, control algorithms, and so forth.

In one or more embodiments, the block diagram schematic 301 includes an audio processing engine 307, which functions in coordination with the one or more processors 304 in one or more embodiments, as a voice assistant module. In one or more embodiments, the audio processing engine 307 is capable of receiving audio input 318,319, processing audio input 318,319, extracting one or more audio characteristics 320,321 from received audio input 318,319, storing one or more voice prints or the extracted audio characteristics as audio identification references 308 in the memory 314, and performing other functions. For example, in one or more embodiments the audio processing engine 307 is operable to receive audio input 318,319 from an environment about the electronic device 300.

The audio processing engine 307 can include hardware, executable code, and speech monitoring and generation executable code in one embodiment. The audio processing engine 307 can be operable with one or more audio identification references 308 stored in memory 314. These audio identification references 308 can include audio characteristics extracted from received audio input, voice prints, audio identification models, or other data structures suitable for use by the one or more processors 304 to uniquely identify received voice input.

For instance, with reference to audio input 318,319, the audio identification references 308 can comprise representations of basic speech models, representations of trained speech models, or other representations of predefined audio sequences that are used by the audio processing engine 307 or the one or more processors 304 to receive and identify voice commands from audio input 318,319 captured by an audio input device such as the one or more microphones 309. (In some situations the audio processing engine 307 is supported by other device sensors.) In one embodiment, the audio processing engine 307 can include a voice recognition engine. In one embodiment, the audio processing engine 307 can access various speech models stored with the audio identification references 308 to identify not only speech commands, but identifying audio characteristics 320,321 extracted from the audio input signals corresponding to those speech commands. In other situations, an imager might be ordered to confirm speech to end the task is belongs to same user that started it.

The audio processing engine 307 can be operable with one or more microphones 309. Illustrating by example, a first microphone can be located on a first side of the electronic device 300 for receiving audio input from a first direction, while a second microphone can be placed on a second side of the electronic device 300 for receiving audio input from a second direction.

In one embodiment, the audio processing engine 307 is configured to implement a voice control feature that allows a user to speak a specific device command to cause the one or more processors 304 to execute a control operation. For example, the user may say, "What time is it?" This statement comprises a device command requesting the one or more processors 304 to respond audibly indicating the time of day. In one embodiment the audio processing engine 307 listens for voice commands, processes the commands and, in conjunction with the one or more processors 304, initiates actions or processes in response to the commands.

The one or more processors 304 can perform filtering operations on audio input 318,319 received by the audio processing engine 307. For example, in one embodiment the one or more processors 304 can filter the audio input into a first voice, and other audio input, e.g., a second voice. Thus, in one or more embodiments the one or more processors 304 can perform a filtering operation on received audio input. Such a filtering operation can be used advantageously, for example, to eliminate false command reception by filtering crowd noise from a voice of a person delivering audio input in one or more embodiments.

Various sensors 310 can be operable with the one or more processors 304. General examples of these sensors 310 include time sensors, date sensors, environmental sensors, weather sensors, ultrasonic sensors, location sensors, and so forth. These sensors 310 can be used alone or in various combinations.

A touch sensor, for example, can include a capacitive touch sensor, an infrared touch sensor, resistive touch sensors, or another touch-sensitive technology to receive touch input at the housing 302 of the electronic device 300. A temperature sensor can be configured to monitor the temperature of the environment about the electronic device 300. A light sensor can be used to detect whether or not ambient light is incident on the housing 302 of the electronic device 300. A location sensor can be included for determining a location and/or movement of the electronic device 300. Other examples of sensors 310 will be obvious to those of ordinary skill in the art having the benefit of this disclosure.

The sensors 310 can also include a motion sensor, which can include one or more accelerometers or gyroscopes. In one embodiment the motion sensors are operable to detect movement, and direction of movement, of the electronic device 300 by a user. The motion sensors can optionally be configured as an orientation detector that determines an orientation and/or movement of the electronic device 300 in three-dimensional space. The orientation detector can determine the spatial orientation of an electronic device 300 in three-dimensional space by, for example, detecting a gravitational direction.

The electronic device 300 can optionally include one or proximity sensors 311. The proximity sensors 311 fall in to one of two camps: active proximity sensors and "passive" proximity sensors. As used herein, a "proximity sensor component" comprises a signal receiver only that does not include a corresponding transmitter to emit signals for reflection off an object to the signal receiver. A signal receiver only can be used due to the fact that a user's body or other heat generating object external to the electronic device 300 serves as the transmitter.

Illustrating by example, in one or more embodiments the proximity sensor components comprise a signal receiver to receive signals from objects external to the housing 302 of the electronic device 300. In one embodiment, the signal receiver is an infrared signal receiver to receive an infrared emission from an object such as a human being when the human is proximately located with the electronic device 300. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The electronic device 300 can optionally include an imaging system 312. The imaging system 312 can include an imager. In one embodiment, the imager comprises a two-dimensional imager configured to receive at least one image of an environment of the electronic device 300. In one embodiment, the imager comprises a two-dimensional Red-Green-Blue (RGB) imager. In another embodiment, the imager comprises an infrared imager. Other types of imagers will be obvious to those of ordinary skill in the art having the benefit of this disclosure.

The imaging system 312 can also optionally include a depth scanner. Where included, the depth scanner can take a variety of forms. In a first embodiment, the depth scanner comprises a pair of imagers separated by a predetermined distance, such as three to four images. This "stereo" imager works in the same way the human eyes do in that it captures images from two different angles and reconciles the two to determine distance.

In another embodiment, the depth scanner employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth scanner comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Where included, the depth scanner adds a third "z-dimension" to the x-dimension and y-dimension defining the two-dimensional image captured by the imager of the imager system 312.

Other components can be operable with the one or more processors 304, and can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker 315, a timer 316 operable with the one or more processors 304, or other alarms and/or buzzers and/or a mechanical output component such as vibrating or motion-based mechanisms.

A context engine 317 can then operable with the various sensors to detect, infer, capture, and otherwise determine persons and actions that are occurring in an environment about the electronic device 300. For example, where included one embodiment of the context engine 317 determines assessed contexts and frameworks using adjustable algorithms of context assessment employing information, data, and events. These assessments may be learned through repetitive data analysis. Alternatively, a user may employ the user interface 303 to enter various parameters, constructs, rules, and/or paradigms that instruct or otherwise guide the context engine 317 in detecting multi-modal social cues, emotional states, moods, and other contextual information. The context engine 317 can comprise an artificial neural network or other similar technology in one or more embodiments.

In one or more embodiments, the context engine 317 is operable with the one or more processors 304. In some embodiments, the one or more processors 304 can control the context engine 317. In other embodiments, the context engine 317 can operate independently, delivering information gleaned from detecting multi-modal social cues, emotional states, moods, and other contextual information to the one or more processors 304. The context engine 317 can receive data from the various sensors. In one or more embodiments, the one or more processors 304 are configured to perform the operations of the context engine 317.

The electronic device 300 can also include an identification system 313. The identification system 313 can be used to compare audio characteristics 320 extracted from a first audio input 318 to other audio characteristics 321 extracted from a second audio input 319 to determine whether the first audio input 318 and the second audio input 319 sufficiently match. For example, the identification system 313 can determine whether one or more substantially matching audio characteristics 322 are present in both the first audio input 318 and the second audio input 319. Alternatively, the identification system 313 can also determine where one or more substantially matching audio characteristics 322 are absent from one of the first audio input 318 or the second audio input 319 as well.

The identification system 313 can also be operable with the imager system 312, where included. The identification system 313 can optionally include a face/context analyzer configured to process an image or depth scan of an object and determine whether the object matches predetermined criteria by comparing the image or depth scan to one or more predefined authentication references stored in memory 314.

For example, the face/context analyzer can identify objects using image recognition, character recognition, visual recognition, facial recognition, color recognition, shape recognition, and the like. Advantageously, the face/context analyzer, operating in tandem with the identification system 313, can be used as a facial recognition device to determine the identity of one or more persons detected about the electronic device 300.

In one embodiment, the identification system 313 determines from whom audio input 318,319 is received, and whether the first audio input 318 is received from the same person as the second audio input 319, by capturing one or more of images with the imager or depth scans with the depth scanner to detect lip movements as the audio input 318 is received. Illustrating by example, when the electronic device 300 receives the audio input 318, the imager system 312 can monitor persons within the environment of the electronic device 300 to determine who is speaking. When later voice input 319 is received, the imager system 312 can perform a similar operation to determine whether the person delivering audio input 319 is the same person that delivered audio input 318.

In another embodiment, the identification system 313 can determine from whom audio input 318,319 is received, and whether the first audio input 318 is received from the same person as the second audio input 319, by analyzing the audio input 318,319 itself. In one or more embodiments, the one or more microphones 309 receive a first audio input 318 comprising a process initiation command 324. The audio processing engine 307 extracts, in one or more embodiments, one or more audio characteristics 320 from this audio input 318. Examples of audio characteristics 320 include one or more of pitch, timbre, cadence, rhythm, volume, spectrum, or combinations thereof. The audio processing engine 307 can further identify the process initiation command 324. The one or more processors 304 can then initiate the process in response to the process initiation command 324.

Thereafter, the one or more microphones 309 can receive a second audio input 319. In one or more embodiments, this second audio input 319 comprises a process control command 325, examples of which include process cessation commands and process modification commands. The audio processing engine 307 extracts, in one or more embodiments, one or more audio characteristics 321 from this second audio input 319. The audio processing engine 307 can further identify the process control command 325.

In one or more embodiments, when this second audio input 319 is received, the one or more processors 304 of the electronic device 300 can determine whether one or more substantially matching audio characteristics 320, e.g., characteristics that are common between the audio characteristics 320 extracted from the first audio input 318 and the audio characteristics 321 extracted from the second audio input 319, sufficiently match. Where the one or more substantially matching audio characteristics 320 are present in both the first audio input 318 and the second audio input 319, the one or more processors 304 can perform the process control command 325. Bun contrast, where the one or more substantially matching audio characteristics 320 are absent from one of the first audio input 318 or the second audio input 319, the one or more processors 304 can ignore the process control command 325. Thus, if the process control command 325 is a process cessation command, the one or more processors 304 can cause the process to continue when ignoring the process cessation command.

In short, the electronic device 300 determines whether it has heard the voice defined by the second audio input 319 before, regardless if the determination is made by analyzing the audio input 318,319 itself or by using the imager system 312 to detect lip movement while the audio input 318,319 is received. If it has, and if the voice matches that delivering the process initiation command 324, the electronic device 300 will act on the process control command 325. Otherwise, the process control command 325 will be ignored. Thus, in one embodiment only the person who started the process can stop it.

Embodiments of the disclosure contemplate that a person may initiate a process by delivering a voice command in the form of audio input 318 to the electronic device 300, with the audio input 318 comprising a process initiation command 324, but then not remain within the environment about the electronic device 300 until the process continues. Using the delivery of audio content as an example, the user may say, "Play the complete works of Ludwig van Beethoven." The one or more processors 304 of the electronic device 300 may then commence this process by delivering Beethoven's nine variations in C minor via the loudspeaker 315.

The person may then leave the room in which the electronic device 300 is situated. Another person may enter, and may wish to use the electronic device 300. However, since the second person is not the person who delivered the process initiation command 324, it may be difficult for the second person to stop the playback of the works of Beethoven without rebooting the electronic device 300. To avoid this situation, embodiments of the disclosure provide for alternate cessation techniques that do not require voice input from the same person who delivered the process initiation command 324 while, at the same time, preventing the frustrating situation of FIG. 1 described above.

In one embodiment, the one or more processors 304 initiate the timer 316 when the process initiation command 324 is received. In another embodiment, the one or more processors 304 initiate the timer 316 when the process commences in response to the process initiation command 324. In another embodiment, the one or more processors 304 initiate the timer 316 in response to the one or more microphones 309 receiving the first audio input 318.

Where the timer 316 expires prior to the process—here the delivery of the content that is the complete works of Beethoven—being completed, in one or more embodiments the one or more processors 304 cease the process. Said differently, the one or more processors 304 cease the process when the timer 316 expires prior to receipt of the second audio input 319. In this example, were the timer 316 to expire prior to the complete works of Beethoven being played, the one or more processors 304 would cease the playback of the String Breaker's catalog.

The duration for which the timer 316 may be set can vary. In this illustration, the process occurring is a media content output operation, namely, the output of the complete works of Beethoven from the loudspeaker 315. Where this is the case, i.e., where the process comprises the delivery of content to an environment of the electronic device 300, the one or more processors 304 may initiate the timer 316 for a duration that is a function of the content output during the content output operation.

Illustrating by example, the timer 316 may be set with a duration that extends an amount of time sufficient to complete the playback of the complete works of Beethoven. Thus, if the user initiates this playback, and then leaves to go on vacation, another person can use the electronic device 300 when the playback is complete. Had the process been to play only the Kreutzer Sonata, the timer 316 could have been set with a duration equal to the amount of time required to play this single piece, and so forth.

Figure 4:
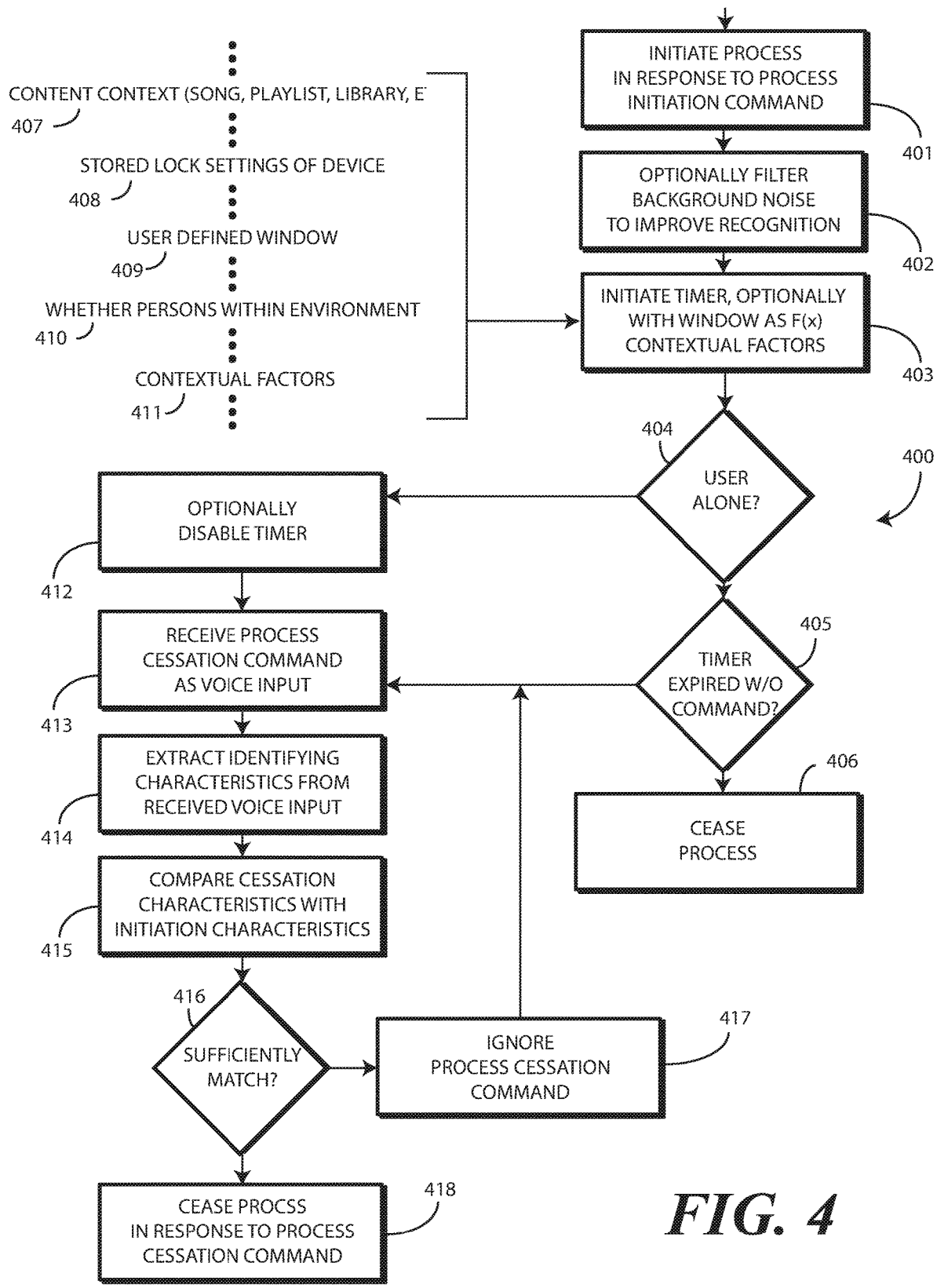
FIG. 4 illustrates another explanatory method in accordance with one or more embodiments of the disclosure.

The timer 316 can be set with other durations as well. Some examples of these other durations are described in FIG. 4. Turning now to FIG. 4, illustrated therein is a method 400 of using the timer (316) of FIG. 3 in accordance with one or more embodiments of the disclosure. The method 400 of FIG. 4 can be preceded by steps (201-203) of FIG. 2 in one embodiment.

Beginning at step 401, the method 400 initiates a process in response to a process initiation command received with audio input from which one or more identifying audio characteristics are extracted. In one or more embodiments, the process comprises a media content output operation, examples of which include playing music, displaying or projecting still images, or displaying or projecting video. Of course, processes other than media content output operations can be performed as well.

At step 402, the method 400 optionally performs a filtering operation. In one or more embodiments, optional step 402 can advantageously eliminate false command reception by filtering crowd noise from a person delivering audio input comprising a process cessation command or process change command.

At step 403, the method 400 initiates a timer. In one embodiment, step 403 occurs in response to receiving the process initiation command that caused the initiation of the process at step 401. In one or more embodiments, step 403 also includes establishing a timer duration window having a predefined duration as described above with reference to FIG. 3.

As noted above, the predefined duration can be of varying lengths or can span varying amounts of time. FIG. 4 illustrates a few of the factors that can be used as inputs to define the predefined duration. Others will be obvious to those of ordinary skill in the art having the benefit of this disclosure.

Illustrating by example, in one embodiment where the process occurring is a media content operation, the timer duration window has a duration that is a function of the context of the content 407 or initiated process type. In one embodiment, the timer duration window has a duration that is a function of the content being output during the media content operation. Where, for instance, the media content operation comprises playing a single song, the timer duration window may have a duration that is equal to the length of the song. By contrast, where the content output during the media content output operation comprises a plurality of songs, the timer duration window may have a duration that is equal to the summed duration of each song in the plurality of songs. Said differently, the duration of the timer window may be equal to an amount of time required to output the plurality of songs.

In another embodiment, the electronic device with which the method 400 is being used may have an electronic device lock window duration 408 after which the electronic device locks or requires a PIN code or other authentication for further use. Such an electronic device lock window duration 408 can be stored in a memory of the electronic device.

In one or more embodiments, the duration of the timer window is a function of the electronic device lock window duration 408. For example, step 403 can comprise retrieving, from a memory of the electronic device, the electronic device lock window duration 408 and establishing the timer duration window to have a duration equal to the electronic device lock window duration 408. Thus, if the electronic device locks due to lack of use during the electronic device lock window duration 408, another person could then use the electronic device.

In another embodiment, the duration of the timer window is user definable, such as by way of a menu setting. User input 409 defining the timer duration can be received at step 403. Thereafter, step 403 can comprise establishing the timer duration window to have a duration equal to the user input 409.

In another embodiment, a condition 410 indicating whether any persons are within an environment of the electronic device can be a factor used in setting the duration of the timer at step 403. Illustrating by example, if people are in the room with an electronic device, step 403 may set the timer for a particular duration. The implication is that the person who delivered the process initiation command may still be in the room and would be capable of delivering the process cessation command or process modification command.

By contrast, if there is no one in the room, it is likely that the person who delivered the process initiation command will not be around to deliver either a process modification command or the process cessation command. Accordingly, when an imager system or other sensor detects that there are no people within an environment of the electronic device, a positive duration for the timer may be set at step 403. That way, if the person delivering the process initiation command leaves the room, the timer expiring could allow another person within the room to use the electronic device when they enter the environment.

In still another embodiment, contextual factors 411 from the environment of the electronic device can be used to set the timer. Consider the situation where the electronic device is a mobile communication device or smartphone and includes an imager system in addition to the voice assistant feature. When a person interacts with the imager and the voice control feature, such as by engaging the device during a call or adjusting the volume, the duration of the timer can be contextually driven at step 403. Step 403 can also include bypassing the timer if, for example, a person engages a touch screen to manually perform process cessation instead of waiting for a voice match to end.

In still another embodiment, the contextual factors 411 can be user defined. The contextual factors 411 can be used to establish a timer duration window. In one or more embodiments, step 403 comprises determining one or more contextual factors 411 within an environment of the electronic device and establishing a timer duration window having a duration that is a function of the one or more contextual factors 411.

Illustrating by example, in one embodiment the owner of the electronic device can preselect, with a user interface, a predetermined number of known voices that are authorized to deliver the process cessation command. In one embodiment this can be permitted regardless of who delivered the process initiation command. In another embodiment, this can be permitted only when the owner or one of the predetermined number of voices delivered the process initiation command. Thus, a parent of a family could define the contextual factors 411 to allow any member of the family to deliver the process cessation command any of when the parent delivers the process initiation command, when a member of the family delivers the process cessation command, or when anyone delivers the process cessation command. Where this contextual factors 411 is used, either the timer can expire upon receiving voice input identified as one of the predetermined voices, thereby allowing anyone to deliver the process cessation command, or alternatively the method 400 can proceed directly to step 418 where the process is ceased.

At decision 404, the method 400 can optionally determine whether one person or multiple persons are within the environment of the electronic device. Illustrating by example, if only one person is in the room with an electronic device, the timer may be disabled at step 412 since there is only one person in the room. The implication of only one person being in the room is that there is not another user that may want to use the electronic device. By contrast, if two or more people are in the room, the timer may be allowed to continue operating. That way, if the person delivering the process initiation command leaves the room, the timer expiring could allow another person within the room to use the electronic device.

Decision 405 can determine whether the timer expires prior to receiving a second audio input comprising a process control command, e.g., a process cessation command, to cease the process. In one or more embodiments, when the timer expires prior receiving such a second audio input, the method 400 can cease the process at step 406.

In some situations, the timer will still be operational when, at step 413, a second audio input comprising a process cessation command will be received. When this occurs, step 414 can include extracting one or more audio characteristics from the audio input received at step 413. As before, these audio characteristics can include identifying characteristics that distinguish the audio input received at step 413 from other audio input received from another person. The audio characteristics can also include the audio input itself, saved as a digital file. In one or more embodiments, the one or more audio characteristics extracted at step 413 include pitch, timbre, cadence, rhythm, volume, spectrum, and so forth. As noted above, other examples of audio characteristics that can be extracted from audio input received by one or more audio input devices will be obvious to those of ordinary skill in the art having the benefit of this disclosure.

At step 415 the method 400 compares the audio characteristics (or voice print) stored when the first audio input was received with the audio characteristics extracted at step 414. Decision 416 then includes determining, with the one or more processors of the electronic device, whether one or more substantially matching audio characteristics (or voice prints) are present in both the first audio input and the second audio input received at step 413.

Where decision 416 determines one or more substantially matching audio characteristics (or voice prints) are present in both the first audio input and the second audio input, the method 400 moves to step 418 which can comprise executing, with the one or more processors of the electronic device, the process control command identified at step 413. Where the process control command comprises a process cessation command, step 418 can comprise ceasing the process in response to the process cessation command. Similarly, where the process control command comprises a process modification command, step 418 can comprise modifying the process, e.g., adjusting volume, brightness, content selection, and so forth, in response to the process cessation command.

By contrast, where decision 416 determines the one or more substantially matching audio characteristics are absent from one of the first audio input or the second audio input, the method 400 can move to step 2417, which can comprise ignoring, by the one or more processors, the process control command. Accordingly, the process can continue.

Figure 5:
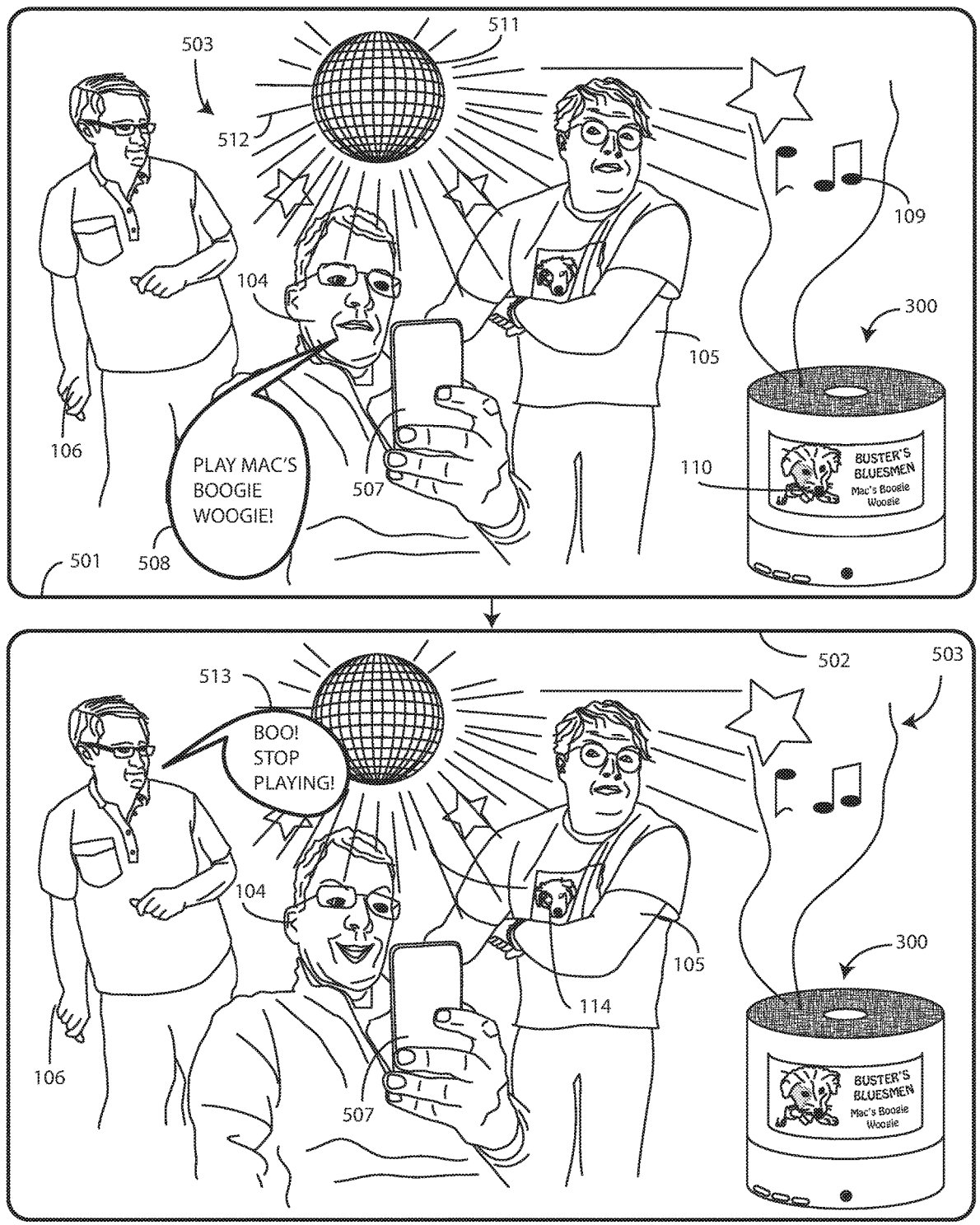
FIG. 5 illustrates one or more method steps in accordance with one or more embodiments of the disclosure.

Turning now to FIG. 5, illustrated therein is a situation involving an electronic device 300 configured in accordance with one or more embodiments of the disclosure. The situation is similar to that described above with reference to FIG. 1. However, the outcome is quite different because rather then partying with a prior art electronic device (100) the revelers of FIG. 5 rock out with an electronic device 300 configured in accordance with one or more embodiments of the disclosure.

At step 501, a party 503 is again occurring. The host 104 of the party 503 is showing pictures to the guests 105,106 of the party 503 on a mobile device 507, which is also configured in accordance with embodiments of the disclosure. To make the presentation livelier, the host 104 delivers a voice command 508 to the electronic device 300 configured in accordance with one or more embodiments of the disclosure. Specifically, the host 104 states, "Play 'Mac's Boogie Woogie.'" This statement is a process initiation command requesting the electronic device 300 begin playing this now infamous song.

The electronic device 300 receives this voice command 108 and executes the same, causing "Mac's Boogie Woogie" 109, by the legendary Buster and his Bluesmen 110, to begin to play. Using additional voice commands delivered to the mobile device 507, the host 104 controls an IoT disco ball 511 and IoT lighting 512, causing the IoT disco ball 511 to spin and reflect light from the IoT lighting 512. The party is rocking.

As before, guest 106 is still a square. Also as before, guest 106 attempts to stop the merriment by shouting, at step 502, "Boo! Stop playing," with "stop playing" being a voice command 513 for the electronic device 300 to stop playing "Mac's Boogie Woogie" 109. The electronic device 300 compares this second voice command 513 to the first voice command 508 and determines that the two came from two different people. Accordingly, the electronic device 300 ignores the latter voice command 513. Guest 106 is now powerless to stop the music, the IoT disco ball 511, or IoT lighting 512.

The host 104 is delighted at thwarting this diabolical plot to seize control of the party 503, as is evidenced by the witty smile on his face. Guest 105, still a huge Buster fan with a picture 114 of Buster on his shirt, is buoyant, and continues to rock on. The party 503 is a complete success. The frustration of FIG. 1 has been obviated. No longer can one square peg ruin the fun by stopping the music with a simple voice command 513. Instead, to quote Michel Legrand, "the music never ends." Well, until the host 104 delivers the process cessation command. Or until a timer, if used, expires. Or alternatively when the process is complete, and so forth.

Figure 6:
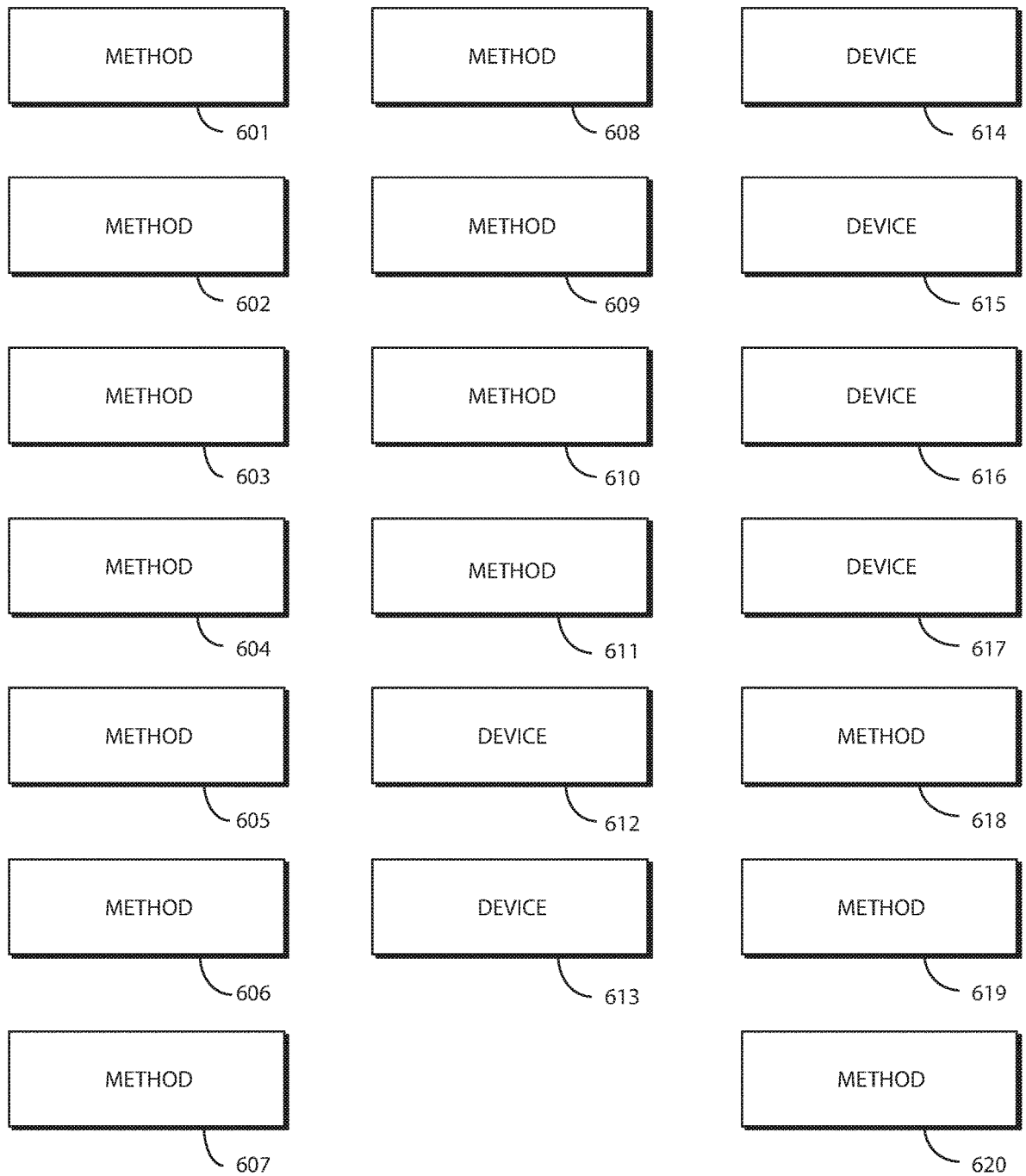
FIG. 6 illustrates one or more embodiments of the disclosure.

Turning now to FIG. 6, illustrated therein are various embodiments of the disclosure. At 601 a method comprises receiving, with one or more audio input devices of an electronic device, a first audio input. At 601, the first audio input comprises a process initiation command. At 601, the method comprises initiating, with one or more processors, a process at the electronic device in response to the process initiation command.

At 601, the method comprises receiving, with the one or more audio input devices, a second audio input. At 601, the second audio input comprises a process control command.

At 601, the method comprises determining, with the one or more processors, whether one or more substantially matching audio characteristics are present in both the first audio input and the second audio input. At 601, where the one or more substantially matching audio characteristics are absent from one of the first audio input or the second audio input, the method comprises ignoring, with the one or more processors, the process control command.

At 602, the process control command of 601 comprises a process cessation command. At 602, the method comprises ceasing, with the one or more processors, the process at the electronic device in response to the process cessation command. At 602, this occurs where the one or more substantially matching audio characteristics are present in both the first audio input and the second audio input.

At 603, the method of 602 further comprises initiating, with the one or more processors, a timer in response to receiving the process initiation command. At 604, the process of 603 comprises a media content output operation. At 604, the method further comprises establishing, with the one or more processors, a timer duration window having a duration that is a function of content output during the media content output operation.

At 605, the content output during the media content output operation of 604 comprises a plurality of songs. At 606, the duration of 605 is equal to an amount of time required to output the plurality of songs.

At 607, the method of 603 further comprises retrieving, from a memory of the electronic device, an electronic device lock window duration. At 607, the method comprises establishing, with the one or more processors, a timer duration window having a duration equal to the electronic device lock window duration.

At 608, the method of 603 further comprises receiving, at a user interface of the electronic device, user input defining a timer duration. At 608, the method comprises establishing, with the one or more processors, a timer duration window having a duration equal to the timer duration.

At 609, the method of 603 further comprises determining, with one or more sensors of the electronic device, whether one person or multiple persons are within an environment of the electronic device. At 609, where only the one person is within the environment of the electronic device, the method includes disabling the timer.

At 610, the method of 602 comprises determining, with one or more sensors of the electronic device, one or more contextual factors within an environment of the electronic device. At 610, the method comprises establishing, with the one or more processors, a timer duration window having a duration that is a function of the one or more contextual factors.

At 611, the method of 601 further comprises performing, with the one or more processors, a filtering operation on the second audio input prior to the determining whether the substantially matching audio characteristics are in the first audio input and the second audio input.

At 612, an electronic device comprises one or more sensors. At 612, the electronic device comprises one or more processors that are operable with the one or more sensors. At 612, the one or more sensors receive a first audio input comprising a process initiation command. At 612, the one or more processors initiate, in response to the process initiation command, a process. Thereafter, at 612 the one or more sensors receive a second audio input comprising a process cessation command. At 612, the one or more processors determine whether one or more substantially matching audio characteristics are present in both the first audio input and the second audio input. Where the one or more substantially matching audio characteristics are absent from one of the first audio input or the second audio input, the one or more processors ignore the process cessation command and continuing the process at 612.

At 613, the one or more sensors of 612 comprise one or more microphones. At 614, the electronic device comprises a timer operable with the one or more processors. At 614, the one or more processors further initiate the timer in response to the one or more sensors receiving the first audio input.

At 615, the one or more processors of 614 cease the process when the timer expires prior to the one or more sensors receiving the second audio input. At 616, the process of 615 comprises a delivery of content to an environment of the electronic device. At 616, the one or more processors initiate the timer for a duration that is a function of the content.

At 617, a method comprises receiving, with one or more sensors, a first audio input comprising a process initiation command. At 617, the method comprises initiating, with one or more processors operable with the one or more sensors, a process in response to the process initiation command. At 617, the method comprises also receiving, with the one or more sensors, a second audio input comprising a process cessation command. At 617, the method comprises determining, with the one or more processors, whether one or more substantially matching audio characteristics are present in both the first audio input and the second audio input. At 617, the method comprises ceasing, with the one or more processors, the process in response to the process cessation command where the one or more substantially matching audio characteristics are present in both the first audio input and the second audio input.

At 618, the method of 617 comprises initiating, with the one or more processors, a timer in response to receiving the first audio input. At 619, the method of 618 comprises ceasing, with the one or more processors, the process when the timer expires prior receiving the second audio input. At 620, the method of 619 further comprises ignoring, with the one or more processors, the process cessation command when the one or more substantially matching audio characteristics are absent from the second audio input.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, comprising:
    receiving, with one or more audio input devices of an electronic device, a first audio input, the first audio input comprising a process initiation command;
    initiating, with one or more processors, a process at the electronic device in response to the process initiation command;
    determining, with one or more sensors of the electronic device, one or more contextual factors within an environment of the electronic device;
    receiving, with the one or more audio input devices, a second audio input, the second audio input comprising a process control command;
    establishing, with the one or more processors, a timer duration window having a duration that is a function of the one or more contextual factors; and
    determining, with the one or more processors, whether one or more substantially matching audio characteristics are present in both the first audio input and the second audio input; and
    where the one or more substantially matching audio characteristics are absent from one of the first audio input or the second audio input, ignoring, with the one or more processors, the process control command;

the process control command comprising a process cessation command, further comprising ceasing, with the one or more processors, the process at the electronic device in response to the process cessation command where the one or more substantially matching audio characteristics are present in both the first audio input and the second audio input.

2. The method of claim 1, further comprising initiating, with the one or more processors, a timer in response to receiving the process initiation command.

3. The method of claim 2, the process comprising a media content output operation, further comprising establishing, with the one or more processors, a timer duration window having a duration that is a function of content output during the media content output operation.

4. The method of claim 3, wherein the content output during the media content output operation comprises a plurality of songs.

5. The method of claim 4, wherein the duration is equal to an amount of time required to output the plurality of songs.

6. The method of claim 2, further comprising:
retrieving, from a memory of the electronic device, an electronic device lock window duration; and
establishing, with the one or more processors, a timer duration window having a duration equal to the electronic device lock window duration.

7. The method of claim 2, further comprising:
receiving, at a user interface of the electronic device, user input defining a timer duration; and
establishing, with the one or more processors, a timer duration window having a duration equal to the timer duration.

8. The method of claim 2, further comprising:
determining, with one or more sensors of the electronic device, whether one person or multiple persons are within an environment of the electronic device; and
where only the one person is within the environment of the electronic device, disabling the timer.

9. The method of claim 1, further comprising performing, with the one or more processors, a filtering operation on the second audio input prior to the determining.

10. An electronic device, comprising:
one or more sensors comprising one or more microphones;
one or more processors, operable with the one or more sensors; and
a timer operable with the one or more processors;
the one or more sensors receiving a first audio input comprising a process initiation command; and
the one or more processors initiating, in response to the process initiation command, a process comprising a delivery of content to an environment of the electronic device, and, in response to the one or more sensors receiving the first audio input, the timer for a duration that is a function of the content;
thereafter, the one or more sensors receiving a second audio input comprising a process cessation command; and
the one or more processors determining whether one or more substantially matching audio characteristics are present in both the first audio input and the second audio input and, where the one or more substantially matching audio characteristics are absent from one of the first audio input or the second audio input, ignoring the process cessation command and continuing the process; or
ceasing the process when the timer expires prior to the one or more sensors receiving the second audio input.

11. The electronic device of claim 10, the content comprising audio content.

12. The electronic device of claim 11, the audio content comprising music.

13. The electronic device of claim 10, the content comprising media content.

14. The electronic device of claim 13, the media content comprising at least one of still images or video.

15. A method, comprising:
receiving, with one or more audio input devices of an electronic device, a first audio input, the first audio input comprising a process initiation command;
initiating, with one or more processors, a process at the electronic device and a timer in response to the process initiation command, the timer having a duration that is a function of one or more contextual factors detected within an environment of the electronic device;
receiving, with the one or more audio input devices, a second audio input, the second audio input comprising a process control command; and
determining, with the one or more processors, whether one or more substantially matching audio characteristics are present in both the first audio input and the second audio input; and
where the one or more substantially matching audio characteristics are absent from one of the first audio input or the second audio input, ignoring, with the one or more processors, the process control command; or
ceasing, with the one or more processors, the process when the timer expires prior receiving the second audio input.

16. The method of claim 15, the one or more contextual factors comprising content output during the process.

17. The method of claim 15, the process control command comprising a process cessation command, further comprising ceasing, with the one or more processors, the process at the electronic device in response to the process cessation command where the one or more substantially matching audio characteristics are present in both the first audio input and the second audio input.

18. The method of claim 15, the process comprising at least one of playing music, presenting images or videos, making voice calls, sending text messages or multimedia messages, interacting with remote computer systems across a network, storing data in a memory, searching the Internet, accessing social media sites, or using navigation systems.

19. The method of claim 15, further comprising performing, with the one or more processors, a filtering operation on the second audio input prior to the determining.

20. The method of claim 15, the process comprising a media content output operation.

* * * * *